C. W. BEALL & O. R. BONNER.
SANITARY PICTURE MOLDING.
APPLICATION FILED FEB. 15, 1909.
963,982.
Patented July 12, 1910.
2 SHEETS—SHEET 1.
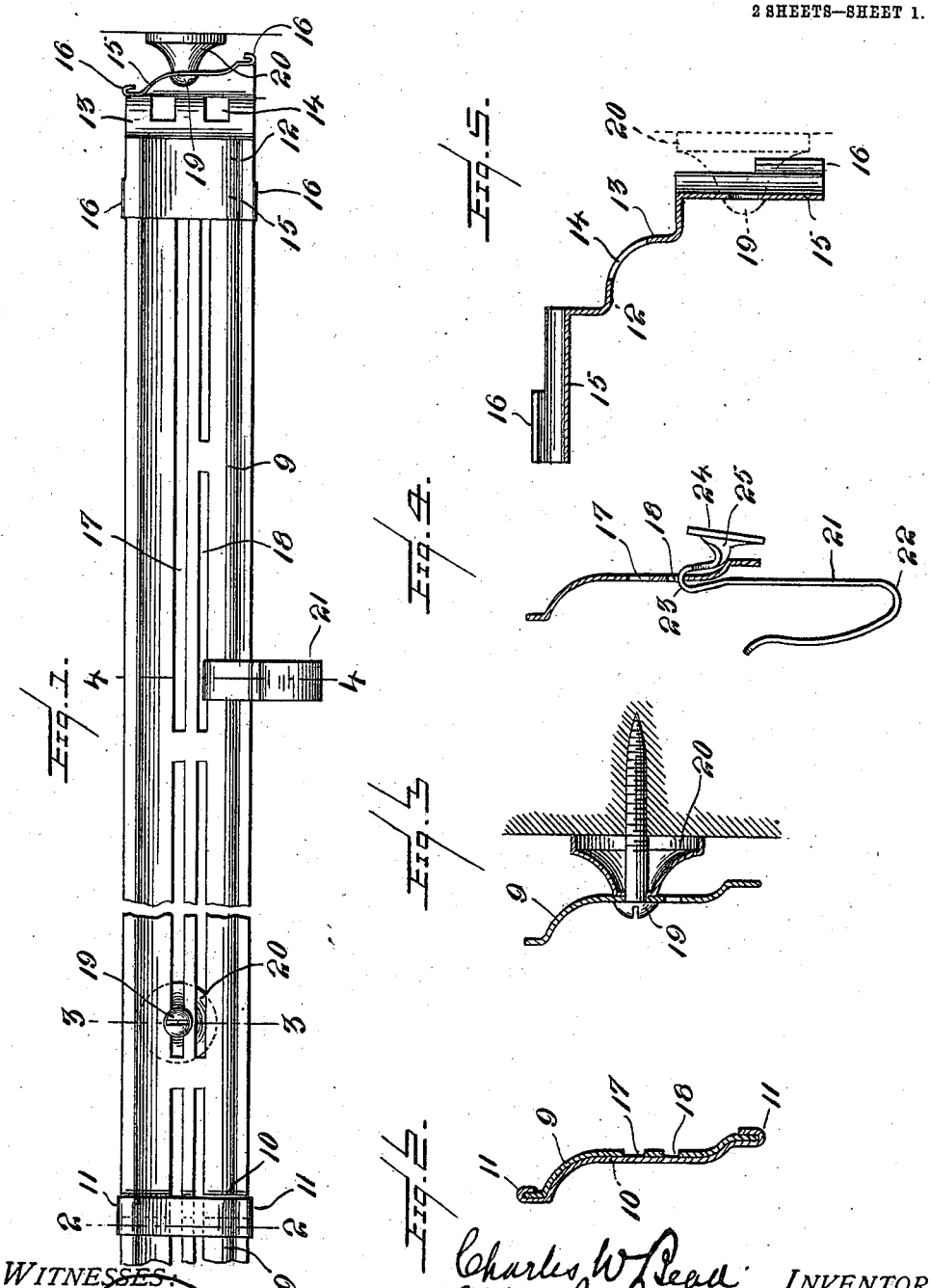

C. W. BEALL & O. R. BONNER.
SANITARY PICTURE MOLDING.
APPLICATION FILED FEB. 15, 1909.
963,982.
Patented July 12, 1910.
2 SHEETS—SHEET 2.
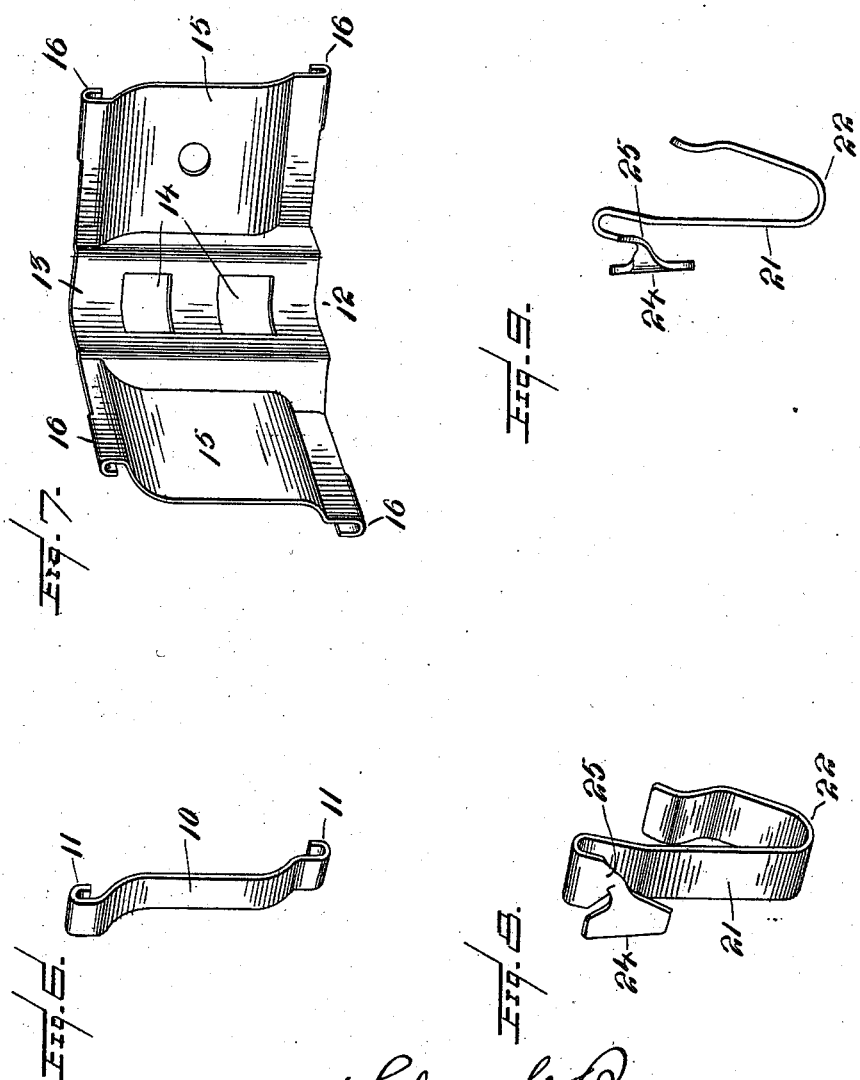

UNITED STATES PATENT OFFICE.

CHARLES W. BEALL AND OLIVER R. BONNER, OF NEW YORK, N. Y.

SANITARY PICTURE-MOLDING.

963,982.  Specification of Letters Patent.  Patented July 12, 1910.

Application filed February 15, 1909. Serial No. 477,979.

*To all whom it may concern:*

Be it known that we, CHARLES W. BEALL and OLIVER R. BONNER, citizens of the United States, and residing in the borough of Brooklyn, New York city, Kings county, New York, have invented a new and useful Sanitary Picture-Molding, of which the following is a specification.

The primary object of the present invention is to provide a picture molding, which will not collect dust, nor attract vermin, said molding being provided with means for spacing it from the wall, admitting light behind it, and permitting the free circulation of air around it.

A further object is to provide a structure of the above character which can be readily applied to a wall by a person comparatively unskilled, the structure moreover being readily applicable to walls of different characters and configurations, being strong, durable, and very ornamental.

The preferred embodiment of the invention is illustrated in the accompanying drawings, wherein:—

Figure 1 is a view in elevation of the molding, showing a corner bracket. Fig. 2 is a sectional view substantially on the line 2—2 of Fig. 1. Fig. 3 is a similar view on the line 3—3 of Fig. 1. Fig. 4 is a cross sectional view on the line 4—4 of Fig. 1. Fig. 5 is a horizontal sectional view through the corner bracket. Fig. 6 is a detail perspective view of one of the couplings. Fig. 7 is a similar view of the corner coupling. Fig. 8 is a perspective view of the hanger hook preferably employed, and Fig. 9 is an end elevation of the same.

Similar reference numerals designate corresponding parts in all the figures of the drawings.

In the embodiment illustrated, the molding is made entirely of metal, any suitable metal being employed. Said molding is preferably stamped from sheets, but it may be cast or otherwise formed. It comprises a plurality of sections 9 located end to end, and of ornamental configuration. The adjacent ends of the sections are joined by couplings 10, which have a cross sectional configuration corresponding to that of the section, said couplings having overturned lips 11, as shown in Fig. 2. At the corners of the rooms, other couplings 12 are employed, each of which is provided with a curved central portion 13 having openings 14 therethrough and angularly disposed flanges 15 behind which the ends of the sections pass, said flanges having rearwardly overturned lips 16 forming seats for the reception of said ends.

The molding sections are provided with upper longitudinally disposed slots 17 and lower longitudinally disposed slots 18. Through the upper slots are passed screws 19 or other suitable fasteners that engage in the wall. These screws also pass through spacing devices 20 interposed between the wall and bracket. It will be observed particularly by reference to Fig. 3, that the spacing devices are in the form of cups having open rear sides that abut directly against the wall. Through the cups the fasteners pass. The spacing devices perform two very important functions. In the first place, as will be evident by reference to Figs. 2, 3 and 4, the molding is entirely spaced from the wall. Consequently no dirt or dust can collect behind the same, and air can freely circulate around said molding. There is therefore no place to harbor insects or vermin, and consequently a sanitary molding is produced. This sanitary effect is heightened by the slots, which admit light behind the molding. The spacing devices also, as shown in Fig. 3, constitute holders for the loose plaster ordinarily broken out by the fastenings. It will thus be evident that when the molding is placed in position, the plaster being collected in the cups, will not soil the floor.

The lower slots 18 are for the purpose of receiving hanger hooks 21 or other suitable devices. While any desired form of hook may be employed, that disclosed is preferred, as it can be moved to different positions in the slots and there is no danger of its becoming accidentally detached. As shown, it is provided at its lower end with the usual upstanding loop 22, and at its upper end with a depending loop 23 that engages in the slot. The end of the loop 23 is, however, provided with a laterally disposed head 24, one side of which is integrally connected by a neck 25 with said loop. The head is disposed longitudinally of the hook, and its length is greater than the width of the slots 18. By placing the hook in a horizontal position, passing the head through the slot, then turning the hook, said hook can be readily placed in position, and its removal can be accomplished by a reversal of the above described operation. When in position, however, and in its depending relation, as shown, it cannot be detached, but can move freely in the slot. It is to be observed that with the arrangement of the hooks in the lower slots and the fasteners in the upper slots, the supporting means for the pictures or other devices will engage with the molding below the points of engagement of the fasteners, and consequently there is not the danger of pulling the molding from the wall that there is with the ordinary molding, which has its upper edge engaged by the hanger hooks.

From the foregoing, it is though that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described our invention, what we claim as new, and desire to secure by Letters Patent, is:—

1. The combination with a molding having separate sets of slots between its upper and lower edges, of fastening means for the molding passing through the slots of one set, and picture hangers engaged in the slots of the other set.

2. The combination with a metallic picture molding having upper and lower sets of longitudinal slots between its upper and lower edges, of cupped spacing devices located in rear of the molding, fasteners passing through the slots of the upper set and through the cupped devices, said devices having open rear sides, and hanger hooks engaged in the slots of the lower set.

3. The combination with a molding having openings therethrough, of a picture hook having a head that passes through the openings when located in one position and will not pass therethrough when the hook is in an operative position.

4. The combination with a molding having slots therethrough, of a picture hook having an upper depending loop provided with a head connected at one side to one side of the loop, said head passing through the slots when the hook is disposed substantially horizontally and having a length greater than the width of said slots.

Signed at the borough of Manhattan in the city, county and State of New York this 9th day of February, A. D. 1909.

CHARLES W. BEALL.
OLIVER R. BONNER.

Witnesses:
EGBERT V. NELSON,
B. A. HEYSER.